United States Patent Office 3,131,132
Patented Apr. 28, 1964

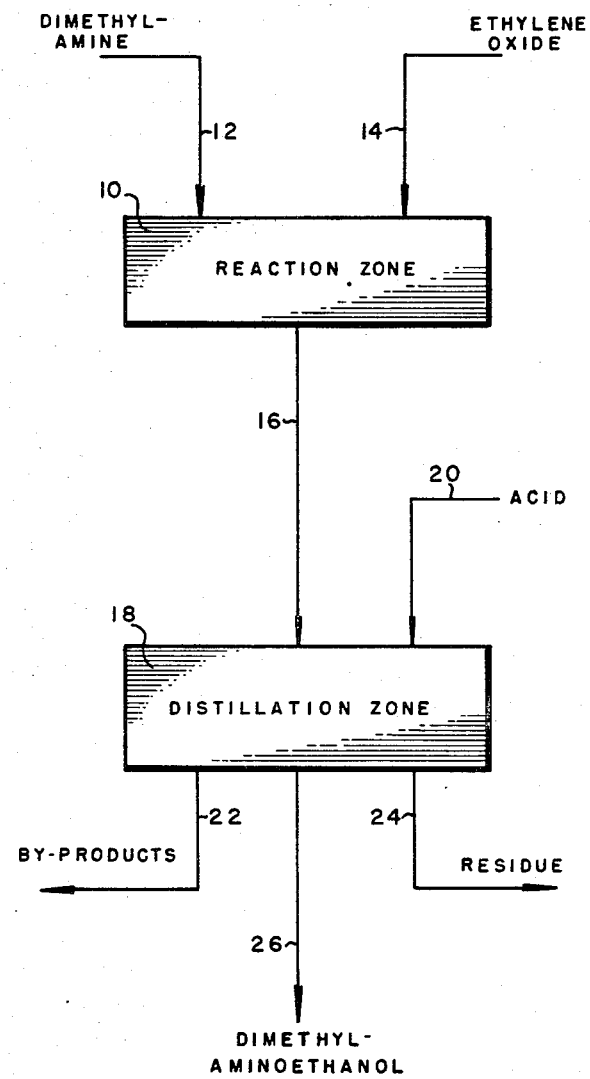

3,131,132
PURIFICATION OF DIMETHYLAMINOETHANOL BY ACID TREATMENT AND DISTILLATION
Philip H. Moss and Ernest L. Yeakey, Austin, Tex., assignors to Jefferson Chemical Company, Inc., Houston, Tex., a corporation of Delaware
Filed June 6, 1962, Ser. No. 200,349
4 Claims. (Cl. 202—57)

The object of this invention is to describe a method of obtaining dimethylaminoethanol that will remain colorless on storage.

It has been kown for some time that ethylene oxide will react with dimethylamine to form N,N-dimethylaminoethanol (hereafter referred to as dimethylaminoethanol). The reaction may be carried out at high temperatures and under pressure in the absence of solvents as described by Schwoegler (U.S. Patent No. 2,337,004). The reaction may also be conveniently run in the presence of polar solvents such as methanol or water. Regardless of what method is used, the dimethylaminoethanol product when recovered by distillation is accompanied by an impurity that causes the product to be highly colored.

We have discovered that the addition of a sufficient amount of an acid to lower the pH to an alkaline pH of about 11.8 or less prior to distillation permits us to obtain water-white overhead products. Products recovered in this fashion have remained colorless after standing for six months in clear glass in the presence of sunlight. In contrast, products not treated with acids have darkened in only a few days or even less. The improvement of the present invention is not obtained with higher dialkylaminoethanols. For example, even with diethylaminoethanol the improvement is marginal in that discoloration will occur within a month or two.

Any organic or inorganic acid can be used to adjust pH prior to the distillation step in which the dimethylaminoethanol is recovered as a distillate fraction, such as sulfuric acid, hydrochloric acid, acetic acid, formic acid, phosphoric acid, oxalic acid, nitric acid, etc. Preferably the feed to the last distillation step is adjusted to a pH of about 11 to 11.8.

The invention will be further illustrated with respect to the accompanying drawing, which is a schematic flow sheet illustrating a representative method for practicing the present invention.

Turning now to the drawing, there is schematically shown a reaction zone 10, such as an autoclave as contemplated by Schwoegler U.S. Patent No. 2,337,004, to which dimethylamine may be added by way of a charge line 12 and to which ethylene oxide may be added by way of a charge line 14.

As indicated in the aforesaid Schwoegler reference, it is preferable to charge the dimethylamine to the autoclave and to heat the charge to a desired reaction temperature and autogenous pressure, such as a temperature within the range of 50° to 100° C. Thereafter, the desired amount of ethylene oxide is charged by way of a line 14.

The crude products of the reaction are discharged from reaction zone 10 by way of a line 16 leading to a distillation zone 18 to which an acid is also added by way of a line 20 in an amount such that the crude reaction product will have a pH of less than about 11.8 (e.g., a pH within the range of 11 to 11.8).

Within the distillation zone 18, the crude reaction product is separated by conventional distillation techniques, such as those contemplated by Schwoegler (e.g., in a column containing stainless-steel packing at about 190 mm. Hg pressure to obtain a fraction boiling at 93°–95° C. comprising dimethylaminoethanol). In such a fashion there is obtained a by-products fraction 22, a residue fraction 24 and a color stable dimethylaminoethanol products fraction 26.

The following examples are typical of the technique used:

Example I

For runs at atmospheric pressure, a one-liter, three-necked flask, equipped with a stirrer, thermometer, Dry-Ice condenser and gas inlet tube was utilized. The flask was charged with 40% dimethylamine and the desired amount of ethylene oxide was weighed in as a gas. The reactions were run below 50° C. After all of the oxide had been added, the reaction mixture was stirred for one hour and the aqueous dimethylamine removed by distillation. The remaining aqueous solution was distilled through a 50 cm. column containing stainless-steel protruded packing at 190 mm. Hg. The dimethylaminoethanol boiled at 93° to 95° C. at this pressure.

A one-liter stainless-steel, stirred autoclave was used for runs in which higher temperatures and pressures of 110 to 130 p.s.i.g. and 50° to 100° C. were used.

On distillation of dimethylaminoethanol from the reaction mixture, a reddish-brown color always formed in the column and head of the distillation apparatus. To obtain colorless dimethylaminoethanol it was necessary to transfer the undistilled portion to another column or stop the distillation and clean out the apparatus before proceeding further if the same distillation apparatus is used. Even so the distilled product turned dark after standing for a short period of a few days.

Example II

To an aqueous solution of products, prepared by the addition of one mol of ethylene oxide to four mols of 60% aqueous dimethylamine in an autoclave at 100° C., was added oxalic acid until the pH of the solution was 11.5. Distillation of the aqueous solution under reduced pressure gave colorless dimethylaminoethanol. The product remained color-stable for six months—the duration of the test.

Example III

To an aqueous solution of products, prepared by the addition of two mols of ethylene oxide to two mols of 40% aqueous dimethylamine at 45° C., was added 50% sulfuric acid until the pH of the solution was 11.8. The aqueous solution was distilled under reduced pressure to yield colorless dimethylaminoethanol. The product remained colorless.

Example IV

To an aqueous solution of dimethylamine (1.0 mol) was added ethylene oxide (1.0 mol) while the temperature was maintained at 45° C. The aqueous solution was distilled under reduced pressure to isolate the dimethylaminoethanol. As the dimethylaminoethanol distilled, much decomposition occurred in the pot. These decomposition products were carried over with the dimethylaminoethanol, resulting in a brownish-black product.

It will be understood by those skilled in the art that other inorganic, organic and solid acids of ion-exchange type, acid clays, etc., are also applicable.

What we claim is:

1. In a method wherein a reaction mixture containing dimethylaminoethanol is obtained by the non-catalytic reaction of ethylene oxide with dimethylamine, the improvement which comprises the steps of adding an acid to said reaction mixture after completion of the reaction in an amount sufficient to provide a pH of not more than about 11.8 and distilling said thus-treated reaction mixture to obtain a color-stable dimethylaminoethanol distillate product.

2. The method as in claim 1 in which the pH is within the range of about 11.4 to 11.8.

3. The method as in claim 1 in which the acid is sulfuric acid.

4. The method as in claim 1 in which the acid is oxalic acid.

References Cited in the file of this patent

UNITED STATES PATENTS

| | | |
|---|---|---|
| 2,007,166 | Hund | July 9, 1935 |
| 2,163,099 | Maxwell | June 20, 1939 |
| 2,337,004 | Schwoegler | Dec. 14, 1943 |
| 2,807,573 | Robertson | Sept. 24, 1957 |
| 3,040,076 | Seidel et al. | June 19, 1962 |